Figure 1:
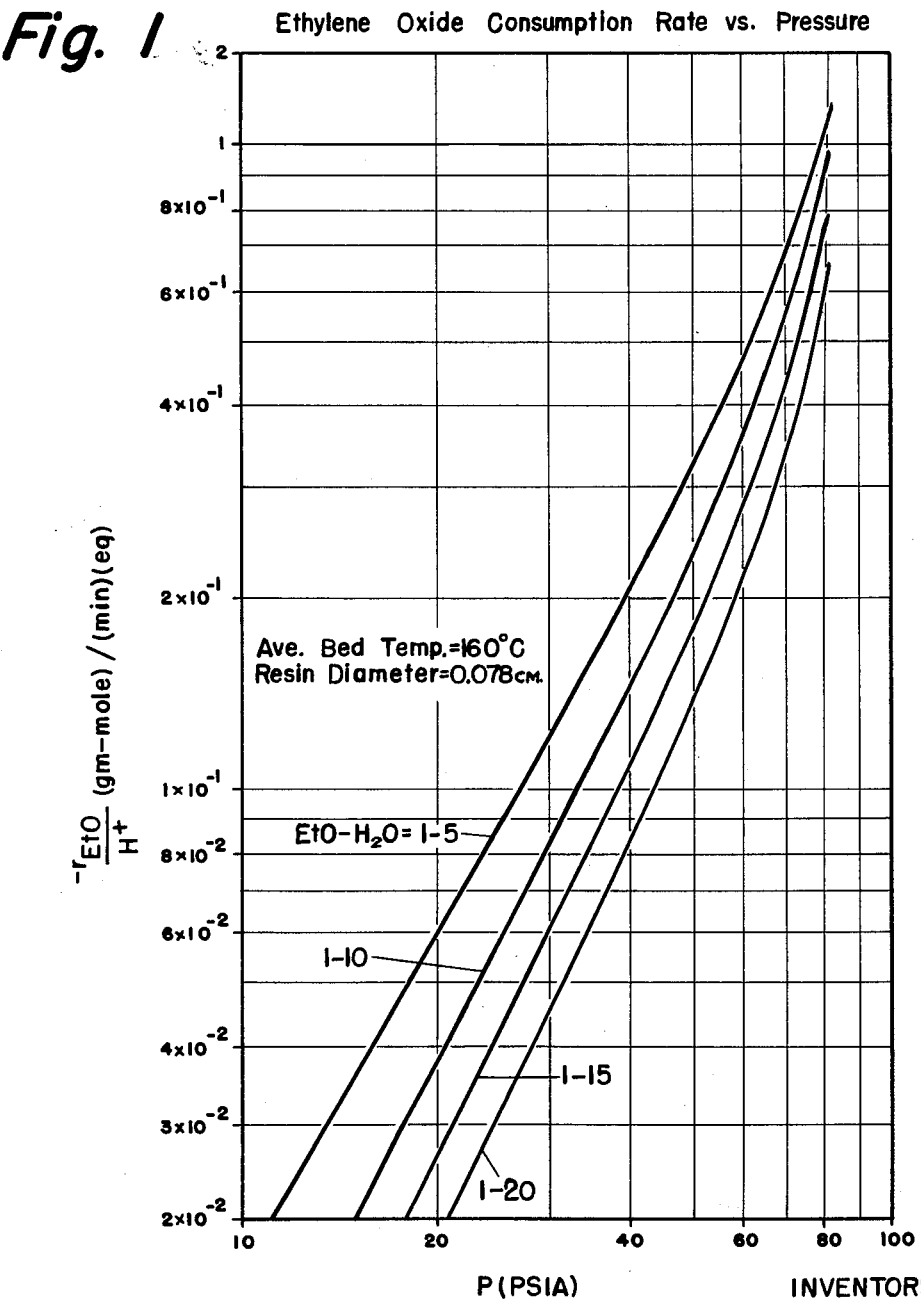

Fig. 1 — Ethylene Oxide Consumption Rate vs. Pressure

May 28, 1963 G. E. HAMILTON ET AL 3,091,647
PROCESS FOR THE PREPARATION OF ALKYLENE GLYCOLS
Filed Feb. 19, 1960 4 Sheets-Sheet 3

INVENTORS
GENE E. HAMILTON
ARTHUR B. METZNER
BY JOHN E. EHRREICH
ATTORNEY

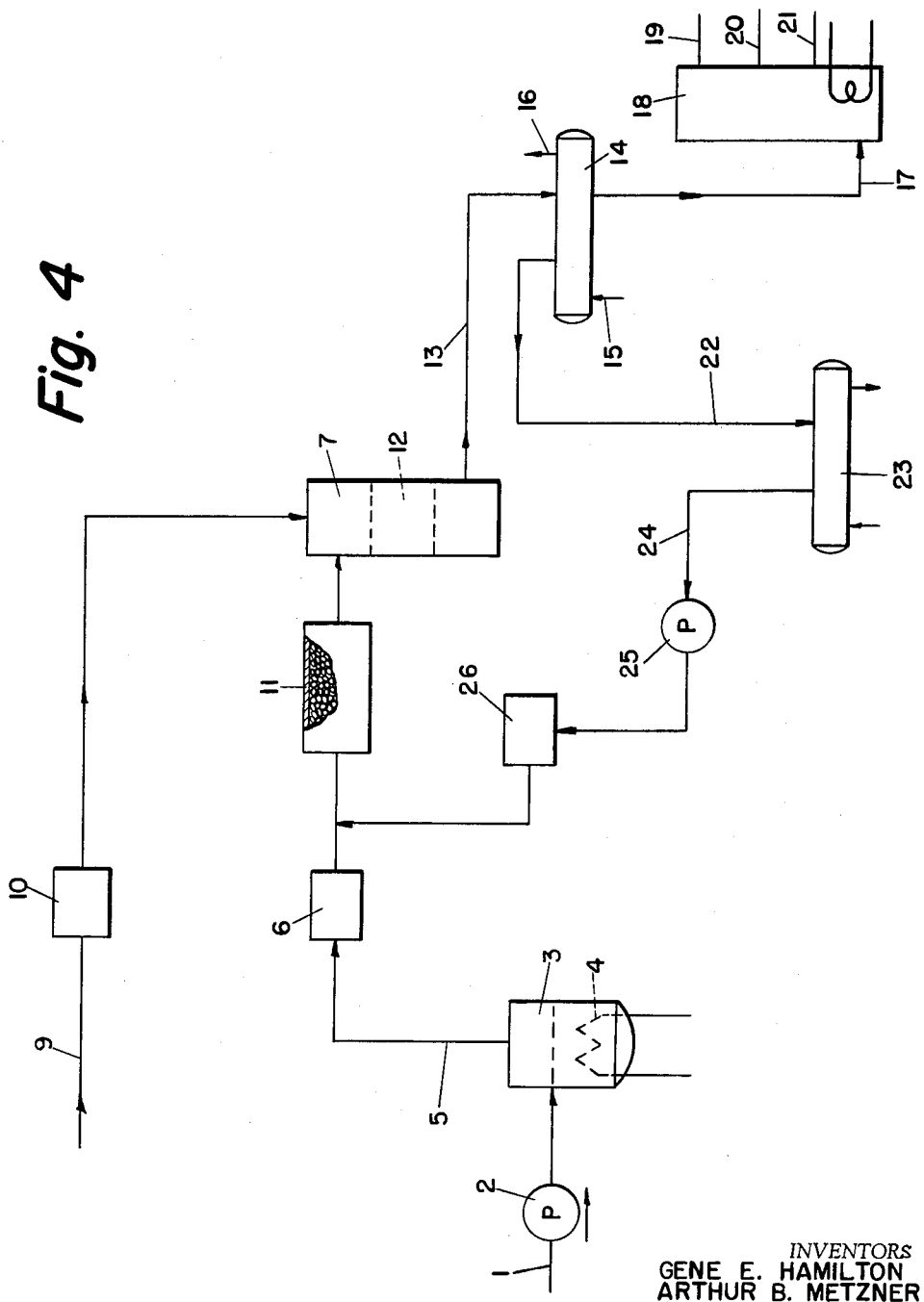

3,091,647
Patented May 28, 1963

3,091,647
PROCESS FOR THE PREPARATION OF
ALKYLENE GLYCOLS
Gene E. Hamilton, Wilmington, Del. (% Sun Oil Co., P.O. Box 426, Marcus Hook, Pa.), Arthur B. Metzner, 1214 Spring Valley Road, Newark, Del., and John E. Ehrreich, 45 Clark St., Belmont, Mass.
Filed Feb. 19, 1960, Ser. No. 9,890
4 Claims. (Cl. 260—635)

This invention relates to a process for the production of low molecular weight alkylene glycols such as ethylene, propylene, and butylene glycols, and more patricularly to a continuous process for the hydration of alkylene oxides in the vapor phase at specific conditions in the presence of an acidic ion exchange resin as catalyst to produce alkylene glycols. More specifically ethylene oxide may be converted to ethylene glycol, an antifreeze component.

Various processes for the production of ethylene glycol by hydration of ethylene oxide have heretofore been proposed, but the only processes which have proven commercially attractive historically are hydrolysis catalyzed by a dilute solution of a mineral acid, and high temperature, high pressure hydrolysis in the absence of a catalyst. The latter process suffers from the disadvantage that expensive, high pressure equipment must be provided, while the acid catalyzed process has the disadvantage that a very dilute solution of ethylene oxide in the acid solution (20:1 molar ratio of water to ethylene oxide, or thereabouts) must be used to prevent the formation of large amounts of by-product polyglycols, thus requiring the evaporation of large quantities of water in the subsequent recovery step. Also, the acid solution is corrosive, requiring the use of expensive corrosion resistant materials of construction.

More recently, Reed et al. in an article in Industrial and Engineering Chemistry, vol. 48, pages 205–208 (February, 1956) have proposed a process for hydrating ethylene oxide in liquid or mixed phase using acidic ion exchange resins as catalysts. The statement is made in this article that vapor phase hydration over such catalysts is unsatisfactory due to the low ratio of ethylene glycol to polyglycols in the reaction products. In addition, under the reaction conditions disclosed in this article, reactor bed temperatures were uncontrollable, and charring of the catalyst occurred. Reed et al. additionally found that when operating in liquid phase, a large excess of water, in the neighborhood of 15:1 mol ratio of water to ethylene oxide, was required in order to prevent the formation of polyglycols when an ion exchange resin catalyst was employed, just as the case of the conventional acid catalyzed reaction.

Studies in the vapor phase conversion technique were reported by Hamilton et al. in Industrial and Engineering Chemistry, vol. 49, pages 838–846 (May 1957). The authors concluded that both temperature and Reynolds number have a very significant effect on product distribution and reaction rates. We have now found that temperature and Reynolds number are not rate controlling.

It is an object of this invention to provide a process for the hydration of ethylene oxide at high reaction rates and which provides high selectivity for either ethylene glycol or polyglycols depending on the product desired. It is a further object of this invention to provide a continuous process featuring partial condensation of the reactor effluent which results in a simple and economical recovery of the glycol product and recycle of the steam and ethylene oxide reactants. Another process feature of the invention is the use of an inert contact mass to remove polymers of the alkylene oxide which form when the oxide is heated to reaction temperature before it enters the reactor.

Still another object of the invention is to provide a process whereby reaction conditions employed are carefully controlled to obtain yields of alkylene monoglycol not heretofore possible at similarly low ratios of water to alkylene oxide.

We have found that the foregoing objects may be attained by passing ethylene oxide and steam over an acidic ion exchange resin at conditions which insure the vapor phase.

While the following description and data are specific to the hydration of ethylene oxide, other low molecular weight alkylene oxides such as propylene oxide and butylene oxide will undergo hydration in the same manner. The hydration mechanism of ethylene oxide and propylene oxide is the same when the hydration reaction is catalyzed by acids of the same strength in the liquid phase. This is shown by Prichard and Long, J.A.C.S., vol. 78, page 2667 (1956). We believe that changing from liquid phase to vapor phase will not change the reaction mechanism, thus the reaction mechanism of propylene oxide in the vapor phase is the same as that of ethylene oxide and the present process is adaptable to both feeds. The same applies to butylene oxide.

Figure 2:
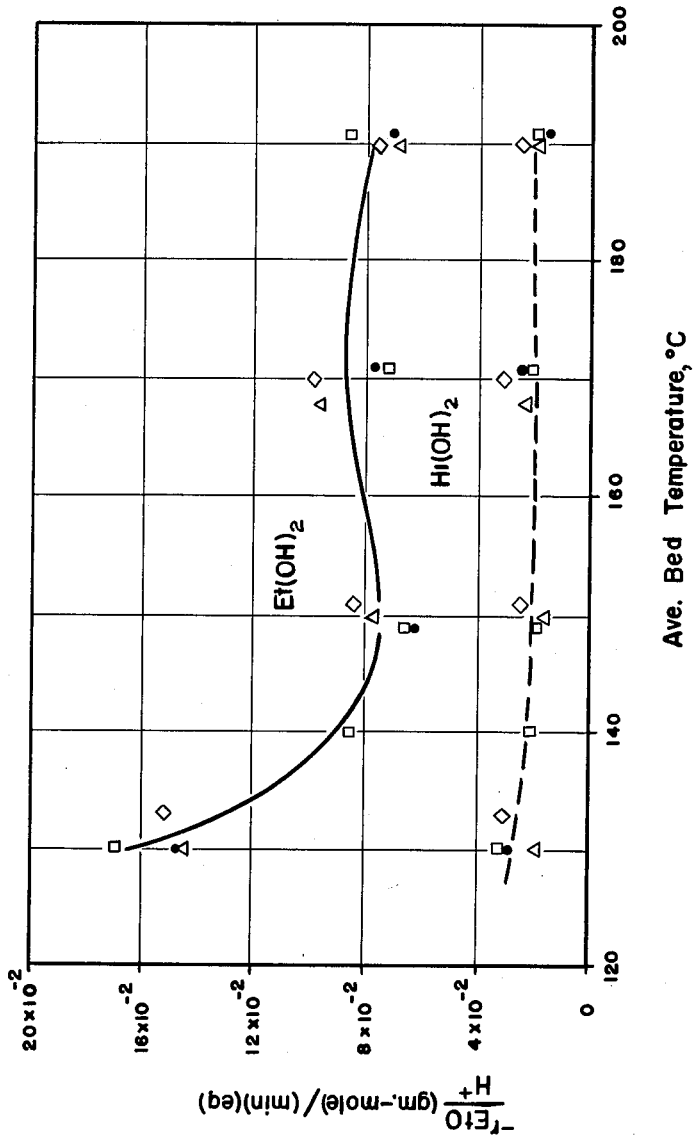
Figure 3:
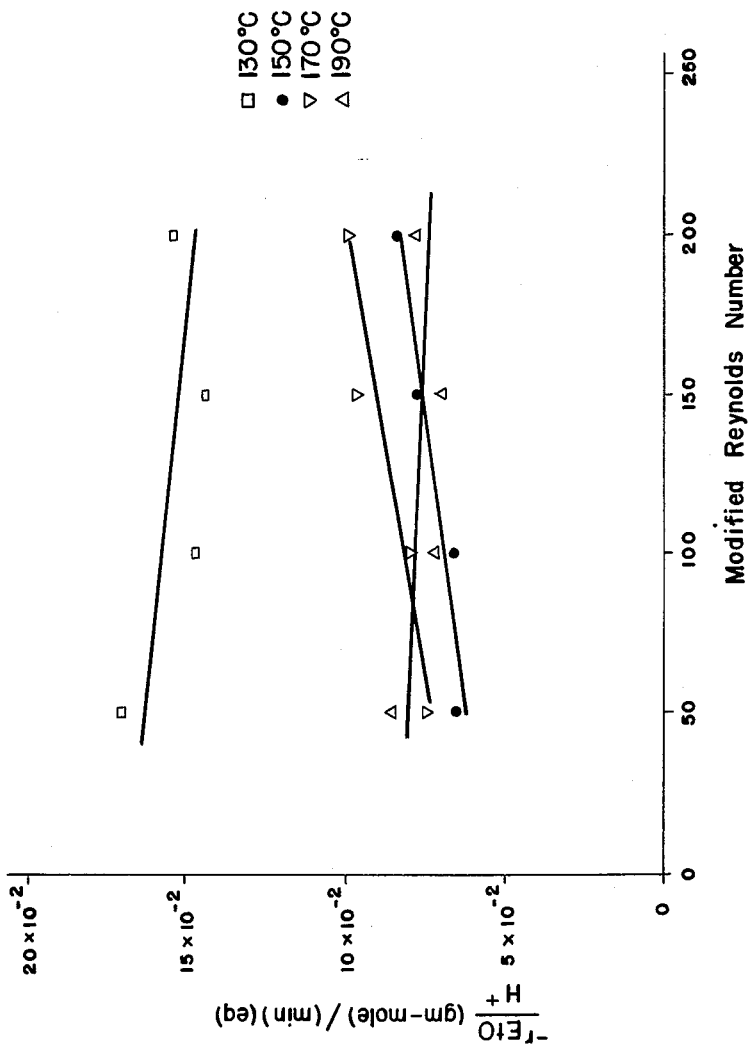

Referring to FIGURE 1, it can be seen from the graph that a four-fold increase in total pressure, i.e., from 20 to 80 p.s.i.a. increases the rate of ethylene oxide conversion per equivalent of H+ or reaction site by a factor of approximately 40. The expression $$\frac{-r \, EtO}{H+} (gm.\text{-}mole)/(min.)(eq.)$$

in FIGURES 1, 2 and 3 denotes gram moles of ethylene oxide reacted per minute per equivalent of hydrogen ion in the catalyst and thus it is a measure of the effect on process efficiency of changes in the variable being examined. These data were obtained at a temperature of 160° C. and a mol ratio of water to ethylene oxide in the feed of from 1 to 5 up to 1 to 20. Thus we have found that reaction rate shows a sharply progressive dependence on total pressure ranging from the second power of total pressure at the lower pressures to the fourth power as saturation pressures are approached. It has been shown that these extraordinary pressure effects are due to the partial pressure of steam, perhaps because the quantities of water sorbed by the catalyst increase rapidly as saturation conditions are approached. It is particularly significant to note that the same type of total pressure effects took place at a mol ratio of water to ethylene oxide of 20 to 1 as those taking place at 5 to 1. It is therefore possible to obtain high reaction rates at relatively low water to ethylene oxide feed ratios, a factor which benefits the separation steps of the process because less water or steam is present along with the desired glycol product.

In order that those skilled in the art may more fully comprehend the nature of our invention and the manner carrying it out, the following examples are given in tabular form:

TABLE I

| | Prior art liquid and mixed phase studies | | Solid catalyzed vapor phase studies | | | | | | | | | | |
|---|---|---|---|---|---|---|---|---|---|---|---|---|---|
| | 10a | 14 | 60a | 60c | 60e | 62d | 36a | 36e | 52a | 51d | 69a | 69b | 69c |
| Temp., °F | 240 | 250 | 320 | 320 | 320 | 320 | 266 | 376 | 325 | 322 | 330 | 340 | 330 |
| Pressure, p.s.i.a | 45.0 | 20.0 | 20 | 60 | 80 | 80 | 34.7 | 35 | 79.7 | 80.0 | 80 | 80 | 80 |
| Mass space velocity, gm./hr./ml. catalyst: | | | | | | | | | | | | | |
| Total | 5.6 | 5.5 | 178 | 175 | 180 | 350 | 91 | 91 | 99 | 177 | 44 | 46 | 47 |
| $C_2H_4O$ | 0.89 | 0.98 | 58 | 58 | 58 | 38 | 17 | 17 | 12 | 24 | 3.3 | 4.9 | 6.2 |
| $H_2O$ | 4.7 | 4.5 | 120 | 117 | 122 | 312 | 74 | 74 | 77 | 153 | 41 | 41 | 41 |
| Molal ratio, $H_2O/C_2H_4O$ | 12.8 | 11.6 | 5.08 | 5.08 | 5.08 | 20.0 | 10.3 | 10.3 | 15.0 | 15.0 | 30 | 21 | 16 |
| Conversion of $C_2H_4O$, percent | 99 | 56 | 0.94 | 7.61 | 17.2 | 13.7 | 11.0 | 5.97 | 47.0 | 32.7 | 51 | 45 | 55 |
| Yield of converted $C_2H_4O$, percent, as: | | | | | | | | | | | | | |
| Ethylene glycol | 70 | 46 | 79 | 80 | 76 | 89 | 85 | 82 | 81 | 78 | 88 | 86 | 73 |
| Higher glycols | 26 | 54 | 21 | 20 | 24 | 11 | 15 | 18 | 19 | 22 | 12 | 14 | 27 |
| Contact time, sec | 650 | 0.29 | 0.0198 | 0.0610 | 0.0803 | 0.0350 | 0.0667 | 0.0588 | 0.1408 | 0.0714 | 0.266 | 0.259 | 0.261 |
| Reaction rate, gm. moles $C_2H_4O$ reacted/hr./ml. catalyst | 0.0200 | 0.0124 | 0.0124 | 0.100 | 0.227 | 0.120 | 0.044 | 0.024 | 0.133 | 0.183 | 0.039 | 0.049 | 0.077 |
| | | | Pressure effect | | | | Temperature effect | | Space velocity effect | | High conversions intentionally showing effect of exceeding ethylene glycol saturation pressure. | | |
| | | | | | Molal ratio effect | | | | | | | | |

In these runs total conversion was purposely kept below the maximum due to the desire to analyze the effect of changes of process variables and because the construction of the reactor was such that heat transfer was inadequate at high conversion conditions. With the proper equipment 100% conversion of ethylene oxide is possible although such high conversions are rarely wanted. Runs 60a, 60c and 60e of Table I also show the effect of total pressure changes when temperature, mass space velocity and the mol ratio of water to ethylene oxide are constant. The conversion of ethylene oxide increased from 0.94% at 20 p.s.i.a. to 17.2% at 80 p.s.i.a. The optimum pressure range is from about 60 p.s.i.a. to about 80 p.s.i.a. The operative pressure range is from about 15 p.s.i.a. to 100 p.s.i.a. One skilled in the art may determine the proper operating pressure to maintain the alkylene glycol product essentially in the vapor phase by using conventional engineering correlations and calculations taking into account the reaction temperature and the partial pressure of steam, alkylene oxide and alkylene glycol. Runs 69a, 69b and 69c show that at relatively constant temperature, pressure and total mass space velocity, an increase in mass space velocity of ethylene oxide and consequent decrease in $H_2O/C_2H_4O$ ratio causes saturation with respect to ethylene glycol in the reaction zone and a sharp decrease in ethylene glycol production.

Runs 10a and 14 of Table I show results of prior art liquid phase and heterogeneous phase operation. These runs were selected on the basis of optimum reaction conditions from the standpoint of high reaction rates expressed as the amount of ethylene oxide reacted per hour per unit volume of catalyst. It is seen that the reaction rates of the present work are in some cases more than ten times those of the prior art. This together with the incorrect conclusion of prior art operators that vapor phase operation prevents high selectivity of ethylene glycol serves to emphasize our discovery.

Temperature is not a particularly significant factor in rate control or product distribution. FIGURE 2 shows that rates are fairly steady in the range of 140–190° C. In FIGURE 2 Et(OH)₂ represents ethylene glycol and Hi(OH)₂ represents higher glycols or polyglycols. The lower limit is about 115° C. since below this temperature practical operating pressures are not high enough to avoid operation of equipment under vacuum. The upper limit of temperature is determined by the stability of the catalyst used. With the acidic ion exchange resins available today this upper limit is approximately 160–200° C. At all temperature levels, the rate of the vapor phase reaction increases markedly as saturation conditions are approached. The preferred temperature range is 115° C. to 200° C.

The distribution of products (that is the ratio of ethylene glycol to higher glycols produced) was found to be very insensitive to the ratio of ethylene oxide to water in the feed, when operating below the saturation pressure of the reactants. This is in marked contrast to the reaction conditions found necessary for high selectivity for glycol formation in the prior art. Under prior art conditions a high selectivity for glycol formation was obtained only when the molal ratio of ethylene oxide to water in the feed was very low, say, a ratio of 1:10 or 1:20. Stated conversely, prior art conditions require high water to ethylene oxide molal ratios. The present effects are shown by comparing runs 60e and 62d of Table I. Comparison of the runs shows that changing the molal ratio of water to ethylene oxide in the feed from a value of 5.08:1 to a value of 20:1 changes the percentage of ethylene glycol in the product glycol mixture from 76 to 89%. While this is an appreciable change, it is smaller than the change that has usually been reported in prior art. Should one, however, desire higher glycols as the major product this may be achieved simply by choosing reaction conditions such that the gases become saturated with respect to ethylene glycol before the desired level of conversion of ethylene oxide is obtained. If this is the case, the ethylene glycol will tend to remain on the surface of the catalyst particles and continue to react there with fresh ethylene oxide to form higher glycols. For example, at a bed temperature of 160° C. and a total pressure of 40 p.s.i.a., 84% of the product glycol mixture was found to be ethylene glycol when a bed volume of 25 ml. of catalyst was used. In this particular run a molal ratio of water to ethylene oxide in the feed was 10:1. In a second run at approximately the same total feed rate but with a molal ratio of water to ethylene oxide in the feed of 20:1 and with a bed column four times as great as in the previous case, the product glycol mixture consisted almost entirely of higher glycols. In this case the temperature was about the same as before but the total pressure was 80 p.s.i.a. At this higher pressure and with the greater catalyst volume used in this last run the gases became saturated with respect to ethylene glycol only a short distance from the inlet to the bed. From this point onward through the bed the primary products of reaction conditions may be changed at will to produce a product mixture consisting of approximately 80 to 90% ethylene glycol or conversely as high as 89 to 90% of higher glycols should these be desired as the major product. It is understood that normally, however, the major desired product will be ethylene glycol rather than the higher glycols. Therefore, mol ratios of water to ethylene oxide of 5:1 to 30:1 are operative and ratios of 5:1 to 10:1 are preferred. Since the volatility of ethylene glycol is limited over the range of temperature from approximately 100 to 200° C. it is generally desirable to operate near the upper end of this temperature region in order to be able to use as high a molal ratio of ethylene oxide to water in the feed as possible and to obtain high conversions of the ethylene oxide in this mixture, all without running into the difficulty of conversion of the product to higher glycols.

FIGURE 3 is a graph which compares modified Reynolds number to reaction rate for temperatures of from 130 to 190° C. The modified Reynolds number is expressed by the equation:

$$Nre = \frac{DpVo\rho}{\mu}$$

Where $Dp$ is the particle size of the catalyst in the bed, $Vo$ is the linear velocity through the empty reactor, $\rho$ is the fluid density, and $\mu$ is the fluid viscosity. Inspection of the slope of the lines shows that reaction rate is not significantly influenced by increasing the modified Reynolds number from about 50 to about 200.

In the Hamilton et al. publication mentioned previously a strong effect of Reynolds number upon the reaction rates was reported and in addition the selectivity of formation was much lower than the results reported herein. Both of these differences have been traced to the fact that the system used in the earlier work for vaporization of the ethylene oxide led to the polymerization of ethylene oxide. These polymers were carried over into the reactor and deposited upon the surface of the catalyst. Under such conditions the importance of the Reynolds number is seen to be due to the fact that the diffusion of the product glycols through the polymer coating on the catalyst particles was the major rate controlling step. Conclusive evidence that the catalyst particles were coated in the Hamilton-Metzner study is shown by the following data:

| Temperature, ° C.: | Gm. gain per gm. original dry resin |
|---|---|
| 115 | 0.057 |
| 125 | 0.052 |
| 140 | 0.040 |
| 170 | 0.009 |
| 200 | 0.007 |

In the final studies upon which the present patent application is primarily based the ethylene oxide was not vaporized in an electrically heated tube as in the earlier work, but rather by mixing it with superheated steam. In this way the high temperature conditions conducive to polymer formation were avoided to a considerable extent. Furthermore, a small knockout drum consisting of a short tube of large diameter and packed with ball bearings was used to drop out any polymer that may have formed, just prior to the point at which the gases entered the contact zone. While Hamilton and Metzner also reported a considerable decrease in catalyst activity during the first few minutes of operation, no such decrease in activity has been observed in the later runs in which the knockout drum discussed above was used to avoid any coating of the catalyst particles with the polymer. Visual examination of the contents of the knockout drum clearly revealed the presence of considerable polymer formation during ethylene oxide vaporization even in the refined technique used in later runs.

Many kinds of solid acidic catalysts may be used to promote the hydration of alkylene oxides. Acid treated clays, or solids on which acids have been deposited such as solid phosphoric acid polymerization catalysts are suitable. We prefer to use an acidic ion exchange resin. These resins are durable, maintain high activity under normal process conditions and they do not contaminate the product. The data presented herein was obtained using a polystyrene sulfonic acid resin known commercially as Amberlite IR–120 and another sulfonic acid resin known commercially as Duolite C–25. Catalyst activity remained high as shown by Table II.

TABLE II

*Catalyst Life and Activity*

| Runs | Ethylene glycol production, lbs. per lb. of catalyst | Activity— Used resin initial |
|---|---|---|
| 23 | 6.3 | 85 |
| 24 | 10 | 89 |
| 25 | 2.3 | 89 |
| 26 | 5.2 | 84 |
| 29 | 8.9 | 91 |
| 33 | 7.5 | 86 |
| 34 | 7.8 | 86 |
| 36 | 16 | 81 |
| 37 | 0.5 | 86 |
| 43 | 31 | 85 |
| 45 | 35 | 88 |
| 47 | 28 | 84 |
| 48 | 32 | 88 |
| 51 | 28 | 81 |
| 60 | 50 | 93 |
| 62 | 25 | 92 |
| 63 | 31 | 92 |

Many kinds of inert materials are suitable for the contact mass which is used to remove polymers of the oxide. For example, crushed stone, quartz, glass, clay, metal balls, Raschig rings, brick chunks may be used. The contact material is packed in a suitable container in any conventional manner.

Referring to the schematic flowsheet, FIGURE 4, liquid ethylene oxide in line 1 is moved by pump 2 into a vaporizing device 3. Vaporization is effected by means of indirect heating through coil 4 with steam, or other suitable heating medium. Ethylene oxide may be fed to the system in the vapor stream from an ethylene oxide plant, if desired. The vapor is passed through line 5 and flowmeter 6 or other suitable flow control device to a knockout zone 11 disposed near the inlet section of the reactor. The knockout zone is filled with steel balls or any other suitable inert contact material adapted to the adsorption of polymer formed by the heating of the ethylene oxide. Superheated steam is passed by line 9 through a flowmeter 10 into the top of the reactor where it mixes with ethylene oxide vapor. The ethylene oxide and steam are mixed in section 7 of the reactor to form a homogeneous mixture. The feed mixture is next passed through the catalyst bed 12 which is supported in the reactor in any suitable manner. The reaction products and unreacted feed material flow from the reactor through line 13 into a partial condensation device 14. A heat transfer medium enters the condenser through line 15 and is removed through line 16. The partial condensation step effects removal of the glycols from the reactor effluent. Condensed glycols are removed by line 17 to distillation tower 18. Ethylene glycol is removed by line 19, di-ethylene glycol is removed by line 20 and higher polyalkylene glycols are removed by line 21. Unreacted ethylene oxide and steam are passed from the condensation zone through line 22, heat exchanger 23, line 24, booster compressor 25 and flowmeter 26 to line 5 wherein they are mixed with the incoming feed. Suitable means, not shown, are used to sample the recycle material to determine the relative amounts of steam and ethylene oxide. Temperatures and pressures of the feed materials and recycle are adjusted as necessary to obtain the desired reactor conditions.

The description of the process given above in connection with the flowsheet is for illustrative purposes only and is not to be considered a limitation on the process of the present invention.

We claim:

1. A continuous process for producing an alkylene glycol which comprises vaporizing an alkylene oxide selected from the group consisting of ethylene oxide, propylene oxide and butylene oxide, contacting said hot vapor with an inert particulate contact mass to adsorb thereon the polymers of the oxide formed during vaporization, forming a mixture of steam and vaporized alkylene oxide in which the mol ratio of steam to alkylene oxide is between about 5 to 1 and 20 to 1, and contacting the mixture at a temperature in the range of 115 to 200° C. and at a pressure between about 20 p.s.i.a and 80 p.s.i.a. with an acidic ion exchange resin, said temperature and pressure being regulated such that the resultant alkylene glycol product remains essentially in the vapor phase.

2. The process according to claim 1 in which the alkylene oxide is ethylene oxide and the alkylene glycol is ethylene glycol.

3. The process according to claim 1 wherein the pressure is from 60 p.s.i.a. to about 80 p.s.i.a.

4. The process according to claim 1 wherein the mol ratio of steam to alkylene oxide is from 5 to 1 to 10 to 1.

References Cited in the file of this patent

Reed et al.: Industrial and Engineering Chemistry, vol. 48, No. 2 (1956), pages 205–208.